UNITED STATES PATENT OFFICE.

HENRY DREYFUS, OF BASEL, SWITZERLAND.

PROCESS OF MAKING ACETIC ANHYDRID.

1,283,115.

Specification of Letters Patent. Patented Oct. 29, 1918.

No Drawing. Application filed January 18, 1916. Serial No. 72,792.

*To all whom it may concern:*

Be it known that I, HENRY DREYFUS, a citizen of the Republic of Switzerland, residing in Basel, Switzerland, have invented new and useful Improvements in Processes of Making Acetic Anhydrid.

The present invention relates to improvements in the manufacture of acetic anhydrid and has for its object to provide a process whereby the manufacture of acetic anhydrid can be materially simplified, and a very pure product produced with a high yield.

In my French Patent 478951, I have described the manufacture of acetic anhydrid, using pyrosulfate, obtained for example by heating sodium bisulfate *in vacuo*.

In French Patent 448342 of September 16, 1912 and in its addition 17674 of April 18, 1913, I have proposed to manufacture actic anhydrid or other anhydrids of acids of the fatty series by causing acetate of sodium or other salts of the fatty acids to react with sulfuric anhydrid alone or mixed with sulfuric acid or chlorosulfonic acid, while cooling the reaction mixture, comprising for example sodium acetate, before the introduction of the sulfuric anhydrid or mixture of sulfuric anhydrid and sulfuric acid or chlorosulfonic acid.

According to the present invention a salt of acetic acid, such as acetate of sodium or of calcium, is caused to react with sulfuric anhydrid, or sulfuric anhydrid mixed with sulfuric acid or chlorosulfonic acid, this reaction for the formation of acetic anhydrid being carried out in the presence of a diluent or such as acetic anhydrid or acetic acid, and the reaction mixture being cooled to low temperature, *i. e.*, below 5° C. and preferably below 0° C., throughout the reaction.

When the reaction is complete the acetic anhydrid formed can be distilled off, preferably *in vacuo*.

The employment of a diluent is essential, for I have found, especially for the manufacture on a large scale, that unless a diluent is employed it is not possible without using very complicated apparatus, to hold the temperature sufficiently low, to avoid decomposition of considerable of the acetic acid radical. Even if the sulfuric anhydrid or mixture thereof with sulfuric or chlorosulfonic acid is introduced in very small amounts at a time, there is liable to be developed a considerable local overheating, causing local decomposition of the acetic anhydrid and reaction between the products of such decomposition and sulfuric acid compound leading to the production of sulfur or other products of decomposition difficult to remove from the acetic anhydrid. Such a local decomposition also causes a considerable decrease in the yield of acetic anhydrid.

Without using a diluent it is not possible to obtain a homogeneous mixture, so that the yield would also suffer from this cause.

Also it is essential that a low temperature be maintained as before mentioned throughout the reaction.

It is also necessary that when employing actic anhydrid or acetic acid as diluent, the salt of acetic acid shall be present before the sulfuric anhydrid commences to be introduced, for if the acetic anhydrid or acetic acid were to remain even for a short time in contact with the sulfuric anhydrid, decomposition would occur, even at low temperatures, resulting in the formation of sulfo acetic acid and involving, during the subsequent distilling off of the acetic anhydrid, a decomposition developing sulfur and other products, which would not only render the acetic anhydrid impure, but would also diminish the yield of acetic anhydrid.

Thus in every case, and during the entire period of reaction between the sulfuric anhydrid and the acetate, the diluent must be present and the temperature must be kept below 5° C.

In producing the reaction between the sulfuric anhydrid and the dry acetate, the materials should be employed in about the theoretically equivalent quantities, it being noted that one molecule of $SO_3$ corresponds to two molecules of sodium acetate or one molecule of calcium acetate. Thus with sodium acetate the proportions for the reaction are taken in accordance with the equation.

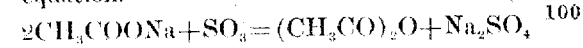
$$2CH_3COONa + SO_3 = (CH_3CO)_2O + Na_2SO_4$$

In carrying out this process the sulfuric anhydrid is added to the acetate mixed with the diluent such as acetic anhydrid or acetic acid, cooling the mass throughout the reaction to maintain it below 5° C. and preferably below 0° C., and agitating.

After the reaction has been completed, the acetic anhydrid can be distilled off, preferably *in vacuo*.

When mixtures of sulfuric anhydrid and sulfuric acid are employed I may use mixtures containing for example from 50 to 70%, more or less, of free sulfuric anhydrid.

I claim—

1. A process for the manufacture of acetic anhydrid which comprises causing sulfuric anhydrid to react with a dry salt of acetic acid in presence of a liquid diluent incapable of reacting with acetic anhydrid and maintaining the temperature below 5° C. throughout the reaction.

2. A process for the manufacture of acetic anhydrid which comprises causing sulfuric anhydrid to react with a dry salt of acetic acid in presence of a liquid diluent incapable of reacting with acetic anhydrid and maintaining the temperature below 0° C. throughout the reaction.

3. A process for the manufacture of acetic anhydrid which comprises causing sulfuric anhydrid to react with a dry salt of acetic acid in presence of liquid acetic anhydrid and maintaining the temperature below 5° C. throughout the reaction.

4. A process for the manufacture of acetic anhydrid which comprises causing sulfuric anhydrid to react with dry sodium acetate in presence of a liquid diluent incapable of reacting with acetic anhydrid and maintaining the temperature below 5° C. throughout the reaction.

5. A process for the manufacture of acetic anhydrid, which comprises causing sulfuric anhydrid to react with dry sodium acetate in presence of a liquid diluent incapable of reacting with acetic anhydrid and maintaining the temperature below 0° C. throughout the reaction.

6. A process for the manufacture of acetic anhydrid, which comprises causing sulfuric anhydrid mixed with sulfuric acid to react with a dry acetate in presence of a liquid diluent incapable of reacting with acetic anhydrid, and maintaining the temperature below 5° C. throughout the reaction.

7. A process for the manufacture of acetic anhydrid, which comprises causing sulfuric anhydrid mixed with sulfuric acid in a proportion of between 50 and 70% free anhydrid, to react with a dry acetate in presence of a liquid diluent incapable of reacting with acetic anhydrid and maintaining the temperature below 0° C. throughout the reaction.

In testimony I have hereunto subscribed my name.

HENRY DREYFUS.

Witnesses:
FREDERICK ACHENBACH,
ARNOLD ZUBER.